Nov. 2, 1971     E. L. HENDEY     3,616,814
FLUID FLOW CONTROL VALVE
Filed May 2, 1968
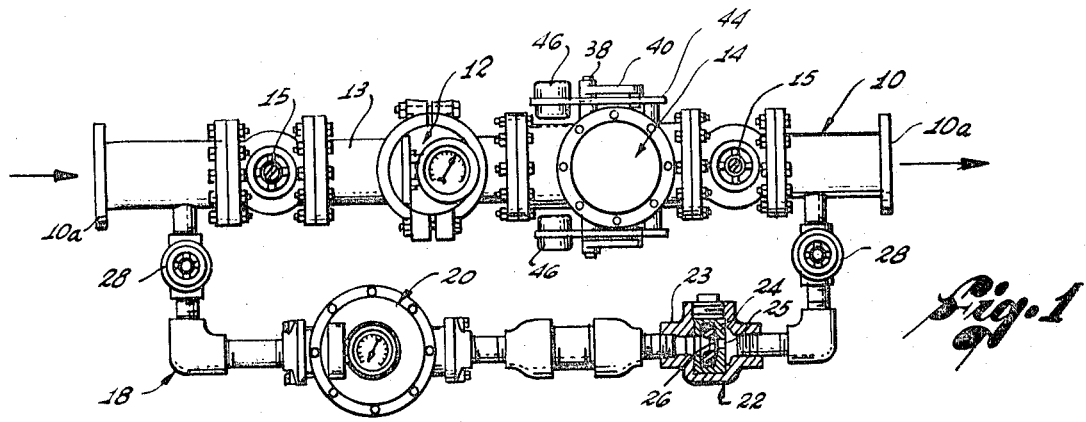
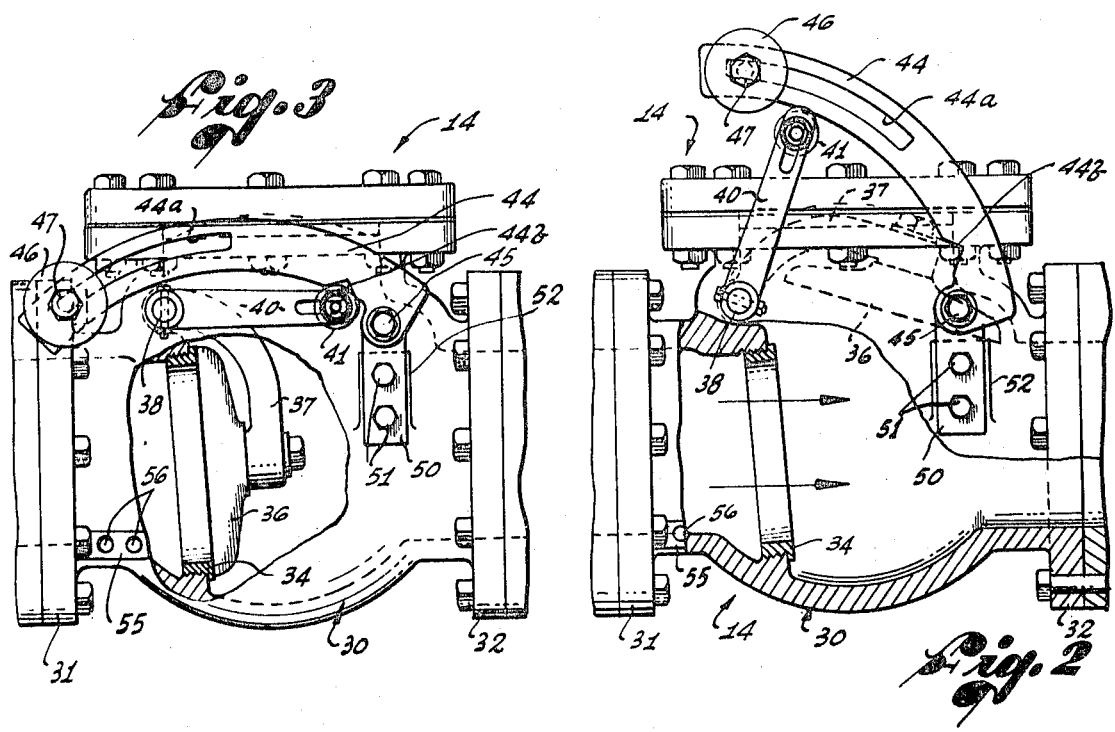
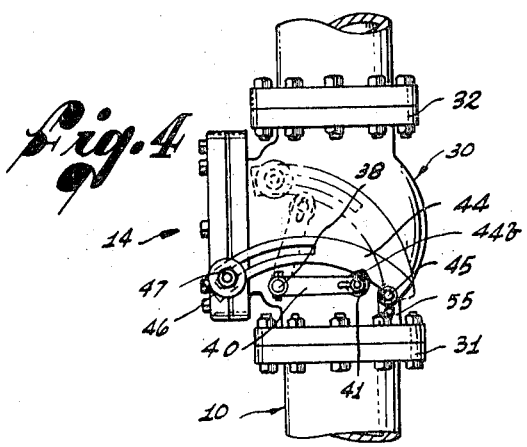
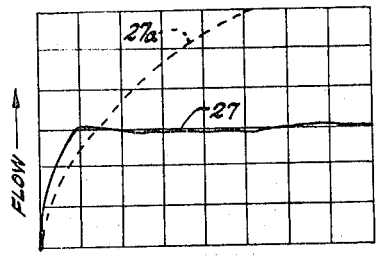
INVENTOR.
EDWARD L. HENDEY
BY
Knight & Rodgers
ATTORNEYS 3,616,814
FLUID FLOW CONTROL VALVE
Edward L. Hendey, 558 W. Pendleton Road,
Banning, Calif. 92220
Filed May 2, 1968, Ser. No. 725,990
Int. Cl. F16k 15/18
U.S. Cl. 137—527.8                                    2 Claims

ABSTRACT OF THE DISCLOSURE

A fluid flow control valve that automatically responds to the flow rate by opening if the flow is beyond a given level and remains closed if below a predetermined value. The valve member is connected to a lever arm that is biased by an adjustable biasing arm. The biasing arm receives the lever arm in a detent notch when the valve member is in a closed position. The effect of the notch, lever and biasing arm arrangement is to cause the valve member to move quickly toward a fully open position, after fluid flow reaches and exceeds a predetermined value. The valve can be adjusted to respond to different flow rates.

BACKGROUND OF THE INVENTION

The present invention relates generally to the measurement of fluid flows and is more especially concerned with improvements in a fluid measurement system comprising a high-range meter and a low-range meter connected in parallel in order to improve accuracy of flow measurements over a wide range of flow rates.

It often occurs that in fluid flow systems there is a wide range of flow rates. An example of this is a water supply system where peak loads require a maximum flow rate that is many times the minimum, or even the usual low flow rates. Under these circumstances, it is often desirable to use a pair of meters operating in parallel to improve accuracy of the measurements by each meter.

Two meters are used in this situation, one having a high measurement range and the other a much lower measurement range. This is done because of the very common characteristics of flow meters to record with a more or less constant absolute error. Being a constant error, rather than a relative or percentage error, this error often becomes appreciable in the low range of the flow rates. Consequently, total accuracy is increased if a large capacity meter is deactivated or by-passed when the flow rate drops below a predetermined value and the flow is diverted entirely through a second meter having a relatively low flow rate such that the actual low flow is within the range of accurate readings of the second meter.

The primary or high range meter is connected in series with a valve which closes when flow drops to a predetermined value, thereby diverting all of the flow through the secondary or low range meter. However, the by-pass duct including the low range meter remains open at all times, even at relatively high flow rates. Under these circumstances, it is possible when the inlet pressure or head is high to overload the low range meter with the consequent possibility of damage to the meter or at least inaccurate readings, since flow through the meter is more than the maximum for which the meter is designed.

Consequently, it is a general object of the present invention to provide a meter installation of this general character, having high and low range meters in parallel, with means for limiting the rate of flow through the smaller meter.

It is also an object of the invention to provide flow limiting means that operates automatically in response to an increase in the flow rate to safeguard measuring equipment.

Since the valve in series with the high range meter is designed to close at a predetermined value of fluid flow, it may be that after a given installation is completed, it is found that the valve closes at or near a flow rate that is maintained normally or is encountered frequently in the system. This situation is undesirable because the shutoff point of the valve coincides with normally or frequently encountered conditions, thus causing unnecessary and frequent operation of the valve with possible adverse affects on the accuracy of the measuring meters.

It is preferable that the shutoff point be above or below a commonly encountered flow rate so that the valve is not frequently shifting or hunting between open and closed positions. In other words, it is preferable that in the particular installation, any relatively stable flow rates be either above or below the shutoff point.

Accordingly, it is also an object of the present invention to provide a design for the flow control valve which enables ready adjustment in the field to establish a shutoff point for the valve which is favorable under the conditions actually established, after installation of the equipment is complete.

SUMMARY OF THE INVENTION

These and other objects and advantages of the present invention are achieved in a flow measuring installation comprising a main fluid duct in which a high flow range meter is placed in series with valve means closing the duct to fluid flow at a flow rate below a predetermined value; and a by-pass duct connected at both ends to the main duct and having a low flow range meter in the by-pass operating in parallel with the high range meter and the valve means. The by-pass includes flow limiting means which operate automatically to restrict fluid flow in the by-pass to a substantially constant maximum flow rate regardless of the inlet pressure, thereby protecting the low flow range meter against overloading.

The main flow control valve in series with the high range meter has means biasing the valve member to a closed position against a valve seat, thereby shutting off fluid flow in the main duct when flow drops to or below a predetermined value; and this value is preferably the same or close to the maximum flow rate allowed in the by-pass. The flow rate at which the valve closes is controlled by adjustable means located outside the valve housing which may be adjusted manually while the valve is in service for changing the biasing force on the valve and consequently the flow rate at which the valve closes. This adjustable means includes a pivotally mounted biasing arm located externally of the valve means and a weight movable along the arm to selected positions. In a preferred form, the valve member is provided with two operating arms, each of which engage a pivotally mounted biasing arm.

In a preferred embodiment of the invention, the valve housing is provided with a pair of mounting pads on the exterior of the valve housing to which the biasing arm can be attached. One of the pads is so located that the biasing arm and valve member operate in the desired fashion when flow through the valve housing is in a horizontal direction; and the other mounting pad is so located that if the biasing arm is mounted on the other pad when the housing is changed in orientation to provide for vertical flow through the housing, the biasing arm is still in a similar position with respect to a horizontal plane.

DESCRIPTION OF THE DRAWING

How the above objects and advantages of the present invention, as well as others not specifically mentioned herein, are achieved will be more readily understood by reference to the following description and to the annexed drawing, in which:

FIG. 1 is a plan view of a fluid flow metering installation, with the flow limiting device in median section, constructed according to the present invention;

FIG. 2 is an enlarged side elevation of the flow control valve, showing the positions of the parts when the valve is open;

FIG. 3 is a view similar to FIG. 2 showing the positions of the parts when the valve is closed;

FIG. 4 is a side elevation of the valve at reduced scale showing the alternate mounting of the biasing arm when the axis of fluid flow is vertical; and FIG. 5 is a graph illustrating the effect on by-pass flow of the flow limiting means.

DESCRIPTION OF A PREFERRED EMBODIMENT

Referring now to the drawing, and more particularly to FIG. 1, there is shown therein in plan view an installation for measuring fluid flow that comprises a main duct 10 through which a fluid, typically water, flows from left to right. The duct may be composed more or less of pipe; but it also includes other components, such as valves, meters, and the like, as will be further described. The duct is connected to a fluid pipe or duct, not shown, by any suitable means, as by terminal flanges 10a. In this case, the main duct includes a primary flow meter 12 which has a comparatively high measurement range or high capacity. Meter 12 may be of any suitable type; but is preferably a propeller type meter located in a cylindrical section 13 of the duct, for reasons which will become more apparent.

In series with meter 12 in duct 10 is a flow control valve 14 which will be described in greater detail later. On either side of meter 12 and valve 14 are shutoff valves 15, which are typically gate valves and may be of any suitable type. These valves are normally open but are provided with hand wheels or other controls by which the valves may be closed in order to close them. Shutoff valves 15 are located both upstream and downstream from meter 12 and valve 14 so that by closing the two valves 15, either the meter 12 or the valve 14, or both, can be taken out of the line for service or repair without entirely shutting off fluid flow through the pipe line (not shown) serviced by main duct 10.

This condition exists because by-pass line 18 is provided, by-pass being connected to main duct 10 upstream from one valve 15 and downstream from the other valve 15, by-pass 15 thus serving to carry fluid, within the capacity of the by-pass around any break in the main duct between the tow ends of the by-pass. Thus, it will be seen that when valves 15 are closed, they operate to isolate the high range flow meter and the control valve 14 from the by-pass.

By-pass line 18 includes flow meter 20 which is of a relatively low flow measuring range or low capacity; and this meter likewise may be of any suitable type. In the by-pass in series with meter 20 is flow limiting means 22 which operates automatically to limit the rate of flow through the by-pass.

The flow limiting device 22 comprises a housing 23 in which is a rigid web or diaphragm 24. Diaphragm 24 has a centrally located orifice 25 through which fluid flows. On the upstream side of diaphragm 24 is a resilient ring 26 which bears against the upstream side of diaphragm 24. As can be seen from FIG. 1, the upstream surface of diaphragm 24 has a conical shape, the surface being inclined toward the central orifice 25. The elastic ring 26 has a central opening that is equal to or larger than orifice 25 when the ring is not under pressure.

However, fluid pressure on the upstream side of diaphragm 24 causes elastic ring 26 to press tightly against the diaphragm and the combination of the slope of the upstream side of the diaphragm and the pressure of the fluid on the ring compresses the ring sufficiently to restrict the central opening. The elasticity of the ring and the slope of the diaphragm surface are selected so that at a desired pressure on the upstream side of the diaphragm, the elastic ring is automatically constricted in response to fluid pressure to provide a central orifice which becomes smaller than orifice 25. Consequently, the net available area for fluid flow decreases with an increase in pressure above a selected value so that the fluid actually passing through by-pass 18 is limited to a predetermined maximum value that is substatnially constant, as shown by curve 27 in FIG. 5.

A simple orifice as at 25 in series with fluid meter 20 provides by itself a high degree of protection for the meter against overloading since the restriction to fluid flow provided by the orifice operates to restrict fluid flow. However, a fixed orifice does not limit flow to a maximum value, rather flow increases with pressure as shown by curve 27a in FIG. 5. The action of the elastic ring in reducing the size of the orifice when the upstream fluid pressure reaches or exceeds a certain value operates to effectively place an upper limit upon the fluid flow through the by-pass. Consequently, meter 20 always is operating within its designed range of flows regardless of the fluid pressure, in and consequent flow rate through, the main duct.

At each end of by-pass 18 is a shut-off valve 28 at a position adjacent the connection of the by-pass to main duct 10. It will be apparent that when the two valves 28 are closed, low flow range meter 20 and flow limiting means 22 are isolated from the main duct and can be removed from the by-pass for replacement or servicing as desired. The shutoff valves 28 are manually operated but are preferably placed at the locations shown to permit service of equipment in the by-pass line without necessarily interrupting service completely by shutting off flow in the main duct.

Flow control valve 14 is shown in greater detail in FIGS. 2 and 3. Valve 14 comprises a housing 30 provided at one end with an inlet opening surrounded by flange 31 and at the other end with an outlet opening surrounded by outlet flange 32. The flanges permit the valve housing to be connected to similar flanges on pipe or other equipment; and it is preferred that the inlet and outlet openings at the flanges be coaxial in order that flow through the valve housing when the valve is open encounters a minimum of obstruction or resistance.

Within valve housing 30 is ring 34 which provides a valve seat. Cooperating with the valve seat is the valve member 36 which, when in engagement with the seat as in FIG. 3, closes the main duct to fluid flow, but which can move away from the valve seat to an open position as shown in FIG. 2, permitting substantially unobstructed fluid flow through valve 14.

Valve member 36 is attached to arm 37 which in turn is non-rotatably attached to shaft 38. Shaft 38 is pivotally mounted in the upper portion of housing 30 and preferably extends at both ends outwardly beyond the wall of housing 30, as may be seen in FIG. 1. At each end of shaft 38, there is attached thereto an operating lever 40, the lever being pin-connected or otherwise secured to shaft 38 to turn with the shaft. Each lever 40 carries at its outer end a roller 41, the outer end of the lever preferably being slotted, as shown, in order to receive a bolt or pin permitting adjustment of the position of roller 41 lengthwise of operating lever 40.

It will be apparent that valve 14 is essentially a check valve. Shaft 38 being above valve closure member 36, the combined weights of member 36 and arm 37 urge the valve member under the influence of gravity toward and into contact with valve seat ring 34, as shown in FIG. 3. However, the pressure of fluid moving through duct 10 from left to right, when sufficient, raises the valve to the full open position shown in FIG. 2.

Valve member 36 is inherently gravity-biased to the closed position; and, consequently, at very low flow rates, depending upon the area of the valve, its weight, and other obviously pertinent factors, the valve will close and shut off fluid flow. However, it is ordinarily desired to close valve 14 at a flow rate greater than that at which the weight of valve member 36 and arm 37 only is effective for this purpose. Consequently, the valve is provided with means for exerting an additional biasing force on valve member 36 that urges the valve to a closed position, thereby raising the flow rate at which the valve closes. This additional means comprises biasing arm 44 which is pivotally mounted by a bolt 45 on the exterior of valve housing 30. Arm 44 is preferably arcuate in shape with its concave underside in contact with roller 41 on the valve operating lever 40.

At the outer or free end of arm 44 is a weight 46. The moment or force exerted by biasing arm 44 on operating lever 40 can be adjusted, within limits, by shifting weight 46 along arm 44; and for this purpose, arm 44 is slotted as at 44a to receive a bolt which joins together the two halves of weight 46, as may be seen in FIG. 1. When the bolt 47 is loosened, weight 46 can be moved to a selected position along arm 44; and then the bolt is tightened to clamp the two halves of weight 46 against arm 44, thereby retaining the weight in adjusted position.

The concave lower edge of biasing arm 44 is preferably provided with a detent notch 44b that is angular in shape, that is, the two sides are straight and at an angle to each other. Roller 41 is positioned along operating lever 40 to enter detent notch 44b, as shown in FIG. 3, when valve member 36 is in engagement with valve seat 34, thereby shutting off flow through the valve. When fluid pressure applied to the upstream face of the valve member reaches a predetermined value, the force tending to move valve arm 36 in a counterclockwise direction becomes sufficient to move the roller out of the detent notch. The subsequent counterclockwise movement of the valve operating lever raises the biasing arm 44 as illustrated in FIG. 2.

It will be apparent that in the open position the biasing force applied by biasing means 44 and 46 to the valve member is decreased. This is because the horizontal component of the lever provided by arm 44 decreases as the arm swings in a clockwise direction, bringing weight 46 more nearly directly above pivot 45. Likewise, the point of contact between operating lever 40 and biasing arm 44 moves outwardly, approaching the position of weight 46. These considerations, plus the restraining influence of detent notch 44b, cause valve member 36 to move quickly toward a fully open position, after fluid flow reaches and exceeds a certain predetermined value.

Biasing force exerted by arm 44 and weight 46 is a maximum when weight 46 is at the end of slot 44a and is decreased as the weight is moved toward the inner end of the slot. In this manner, the valve can be adjusted in the field, after installation, to open at a predetermined flow value. This flow value is preferably some transient value, as opposed to a flow value which is comparatively stable, so that valve 14 operates as much of the time as possible in either a completely open or completely closed position, and the valve is not hunting between open and closed positions, as a consequence of minor fluctuations in fluid flow rates.

There are preferably two biasing arms 44, one at each side of the exterior of the valve housing engaging one of the valve operating arms 40. In this manner, not only can closing torque be applied more evenly to valve shaft 38 by applying it at each end of the shaft, but the total biasing force applied to the valve can be doubled as compared with that available with only one arm and weight of given dimensions.

It will be noticed that the valve operating arms and the biasing arms are all completely outside valve housing 30 and consequently are readily and easily available for adjustment or servicing, as may be required. This is an advantageous feature of the present invention since adjustments can be made quickly and easily without opening the valve housing to provide access to the interior and without in any way interrupting fluid flow through the valve during the adjustment period.

It has been found that the presence of flow limiting means 22 in the by-pass line improves the operation of valve 14 by causing it to open more sharply at a given flow rate. Without flow limiting means 22, any increase in flow entering the system is shared in some proportion between main duct 10 and by-pass 18. However, flow limiting device 22 places a ceiling or upper limit on the flow diverted through the by-pass; and above this ceiling, any increase in flow moves entirely through valve 14. At this point, all of the increased flow entering the system is available at valve 14 to open the valve member 36. Preferably, the biasing force on valve member 36 is selected to open the valve at a flow rate such that the flow rate in the by-pass is close to but slightly above the maximum flow permitted by limiting means 22. Thereby, the valve 14 is closed at lower flow rates that can be accommodated by the by-pass alone, and opens quickly when total flow exceeds the capacity of the by-pass. The capacity of the by-pass is controlled by selecting the size of the flow limiting orifice. This interaction of the means 22 and the valve 14 causes improved operation and greater sensitivity of valve 14 and also results in greater accuracy of operation of the two meters 12 and 20.

Provision of by-pass 18 entirely outside of and around meter 12 and valves 14 and 15, permits the main duct 10 between the connections thereto of by-pass 18 to be essentially a straight passage with minimal resistance to fluid flow. The result is a minimizing of energy losses in the fluid stream as it flows through this measuring system. Energy losses in that portion of the stream flowing through the by-pass are less significant since only a minor fraction of the total flow is through the by-pass. By comparison with previously known arrangements, the total head losses are greatly decreased by making fluid flow through the main duct essentially along a straight path.

Although pipe lines are most commonly placed with their axes horizontal to provide for horizontal flow, there are times in industrial installations where vertical flow is desired. The present valve can be adapted very readily to vertical flow. Pivot 45 for the biasing arm is supported in bracket 50 which in turn is mounted by cap screws 51 on mounting pad 52 on the exterior of housing 30. This pad is so located and arranged that the biasing arm is operative as described when the axis of valve 14 is horizontal.

In order to adapt the valve to vertical flow, a second mounting pad 55 is located near inlet flange 31. It is provided with holes 56 which are drilled and tapped to receive screws 51 so that mounting bracket 50 and arm 44 can be transferred to the second mounting pad 55, as shown in FIG. 4. Valve operating lever 40 is then rotated 90° clockwise with respect to shaft 38 from the position shown in FIG. 3. The valve operating lever and the biasing arm now operate with respect to each other and a horizontal plane in the same manner as previously described. The capability of using the valve for other than horizontal flows is another advantage of locating the lever 40 and arm 44 externally of the valve housing since it thus becomes a relatively simple matter to relocate the mounting pad for bracket 50 to adapt the biasing member to any inclination of the flow axis with respect to the horizontal.

From the foregoing description, it will become apparent that various changes may be made in the detailed design and arrangement of the component parts of the system constituting the present invention, without departing from the spirit and scope thereof. Accordingly, it is to be understood that the above description is considered as being illustrative of, rather than limitative upon, the invention as defined by the appended claims.

I claim:
1. A fluid flow control valve comprising:
a housing having inlet and outlet means;
a valve seat inside the housing;
a valve member cooperating with the seat to shut off fluid flow;
means including a horizontally disposed, rotatable shaft pivotally mounting the valve member on the housing to move between open and closed positions in response to fluid pressure, the valve member being gravity-biased toward the valve seat and said shaft extending outside the housing;
an operating lever attached at one end to the rotatable shaft externally of the housing and having a roller connected to the other end; and
a biasing arm pivotally mounted on the housing externally thereof and engaging the roller connected to the operating lever to exert a biasing force on the lever urging the valve member toward the seat; said biasing arm having a notch of angular configuration which is engaged by the roller when the valve member is in engagement with the seat.

2. A control valve according to claim 1 in which the valve housing has at one side two spaced external substantially co-planar mounting pads each adapted to mount the biasing arm on the housing externally thereof in a different position, the two pads being so arranged and located on the housing that the axis of the valve may be either horizontal or vertical and perpendicular to said pads and the biasing arm can be retained in a similar range of operating positions with respect to a horizontal plane by mounting on a selected pad.

References Cited
UNITED STATES PATENTS

| | | | |
|---|---|---|---|
| 2,568,519 | 9/1951 | Smith | 138—45 |
| 2,969,492 | 1/1961 | Wheatley | 137—527.8 |
| 2,832,367 | 4/1958 | Au Werter | 73—197 X |
| 3,106,220 | 10/1963 | Hose | 137—527.8 |

RICHARD C. QUEISSER, Primary Examiner

M. SMOLLAR, Assistant Examiner

U.S. Cl. X.R.

137—112; 251—75; 73—197